(12) United States Patent
Chae et al.

(10) Patent No.: US 10,263,672 B2
(45) Date of Patent: Apr. 16, 2019

(54) INTEGER FORCING SCHEME FOR MULTI-USER MIMO COMMUNICATION

(71) Applicant: Samsung Electronics Co., Ltd, Suwon-si (KR)

(72) Inventors: Sung-Ho Chae, Seoul (KR); Seok-Ki Ahn, Suwon-si (KR); Cheol Jeong, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/726,338

(22) Filed: Oct. 5, 2017

(65) Prior Publication Data

US 2018/0102818 A1  Apr. 12, 2018

(30) Foreign Application Priority Data

Oct. 6, 2016 (KR) .................. 10-2016-0129301

(51) Int. Cl.
| | |
|---|---|
| *H04W 4/00* | (2018.01) |
| *H04B 7/0452* | (2017.01) |
| *H04W 72/04* | (2009.01) |
| *H04W 72/08* | (2009.01) |
| *H04W 88/08* | (2009.01) |

(52) U.S. Cl.
CPC ...... *H04B 7/0452* (2013.01); *H04W 72/0466* (2013.01); *H04W 72/082* (2013.01); *H04W 88/08* (2013.01)

(58) Field of Classification Search
CPC .......................... H04B 7/0452; H04W 72/082
See application file for complete search history.

(56) References Cited

U.S. PATENT DOCUMENTS

| | | | |
|---|---|---|---|
| 9,118,518 B2* | 8/2015 | Erez ................... | H04L 1/0059 |
| 2013/0128832 A1* | 5/2013 | Kang .................. | H04W 72/042 |
| | | | 370/329 |
| 2014/0141825 A1* | 5/2014 | Koo ..................... | H04W 48/08 |
| | | | 455/501 |
| 2014/0204841 A1* | 7/2014 | Ruiz Delgado ...... | H04B 7/0689 |
| | | | 370/328 |

(Continued)

OTHER PUBLICATIONS

Jiening Zhan et al., "Integer-Forcing Linear Receivers", IEEE Transactions on Information Theory, vol. 60, No. 12, Dec. 1, 2014, pp. 7661-7685.

*Primary Examiner* — Farah Faroul

(57) ABSTRACT

The present disclosure relates to a 5G or pre-5G communication system for supporting a higher data transmission rate successive to a 4G communication system such as LTE. The present disclosure provides a communication method of a Base Station (BS) using an Integer Forcing (IF) scheme in a Multi-User Multiple-Input and Multiple-Output (MU-MIMO) communication system, the method including: receiving a reception signal including a desired signal transmitted from at least one User Equipment (UE) served by the BS and an interference signal transmitted from at least one UE served by a neighboring BS; determining an IF filter considering the interference signal based on information on the interference signal received from the neighboring BS; filtering the reception signal using the determined IF filter; and detecting or decoding at least one of the desired signal and the interference signal using the filtered reception signal.

20 Claims, 7 Drawing Sheets

(56) References Cited

U.S. PATENT DOCUMENTS

| | | | | |
|---|---|---|---|---|
| 2016/0309484 A1* | 10/2016 | Hui | ................ | H04B 7/0413 |
| 2017/0311331 A1* | 10/2017 | Chae | ................ | H04L 1/0059 |
| 2018/0206239 A1* | 7/2018 | Sagong | ................ | H04W 72/04 |
| 2018/0227020 A1* | 8/2018 | Ahn | ................ | H04B 7/0413 |
| 2018/0227079 A1* | 8/2018 | Ahn | ................ | H04L 1/0054 |
| 2018/0262300 A1* | 9/2018 | Kim | ................ | H04L 1/0054 |

\* cited by examiner

INTEGER FORCING SCHEME FOR MULTI-USER MIMO COMMUNICATION

CROSS-REFERENCE TO RELATED APPLICATION

The present application is related to and claims priority under 35 U.S.C. § 119(a) to Korean Patent Application No. 10-2016-0129301, filed on Oct. 6, 2016, the entire content of which is hereby incorporated by reference.

TECHNICAL FIELD

The present disclosure relates to an integer forcing scheme of a wireless communication system and, more particularly, to an integer forcing scheme supporting multi-user Multiple-Input and Multiple-Output (MIMO) communication.

BACKGROUND

In order to meet the demand for wireless data traffic, which has been increasing since the commercialization of a fourth-generation (4G) communication system, efforts are being made to develop an improved fifth-generation (5G) communication system or pre-5G communication system. For this reason, a 5G communication system or pre-5G communication system is referred to as a beyond 4G network communication system or a post Long Term Evolution (LTE) system.

To achieve a high data transmission rate, implementing a 5G communication system in an extremely high frequency (mmWave) band (for example, a 60 GHz band) is being considered. To relieve the path loss of signals and to increase the transmission distance of signals in an extremely high frequency band, beamforming, massive Multiple-Input and Multiple-Output (massive MIMO), Full Dimensional MIMO (FD-MIMO), array antenna, analog beamforming, and large scale antenna techniques are under discussion for a 5G communication system.

Further, to improve the network of the system, technical development in an evolved small cell, an advanced small cell, a cloud Radio Access Network (cloud RAN), an ultra-dense network, Device to Device (D2D) communication, wireless backhaul, a moving network, cooperative communication, Coordinated Multi-Points (CoMP), and interference cancelation is progressing for the 5G communication system.

In addition, an Advanced Coding Modulation (ACM) scheme including Hybrid Frequency Shift Keying and Quadrature Amplitude Modulation (FQAM) and Sliding Window Superposition Coding (SWSC) as well as an advanced access technique including Filter Bank Multi Carrier (FBMC), Non Orthogonal Multiple Access (NOMA), and Sparse Code Multiple Access (SCMA) are being developed in the 5G system.

Among techniques for increasing the frequency efficiency and transmission rate of a wireless communication system, an MIMO transmission scheme is a method for transmitting a plurality of data streams at the same time using a plurality of transmitting/receiving antennas and has an advantage of increasing transmission rate in proportion to the number of antennas.

In order to resolve inter-symbol interference transmitted from a transmitting end of an MIMO wireless communication system, a receiving end may employ a linear equalizer using a linear scheme. As MIMO transmission/reception schemes, linear schemes including Zero-Forcing (ZF) and Minimum Mean Square Error (MMSE) methods and non-linear schemes including a Maximum Likelihood (ML) method and sphere decoding have been proposed. Nonlinear schemes have excellent performance but involve high complexity (particularly, complexity sharply increases when the number of antennas increases). Linear schemes have relatively low complexity but are inferior in performance to nonlinear schemes.

An Integer Forcing (IF) MIMO scheme is newly proposed, which is similar in complexity to linear schemes but provides performance close to that of the ML method (as a nonlinear scheme) with optimal performance.

However, a method for applying the IF scheme to uplink (UL)/downlink (DL) Multi-User (MU) MIMO (MU-MIMO) communication has not yet been proposed.

SUMMARY

To address the above-discussed deficiencies, it is a primary object to provide a transmission/reception scheme for applying an Integer Forcing (IF) scheme to Multi-User Multiple-Input and Multiple-Output (MU-MIMO) communication.

Specifically, the present disclosure proposes an inter-cell interference control method of a base station using an IF scheme, an IF filter setting method, and a Modulation and Coding Scheme (MCS) allocation method in uplink (UL) MU-MIMO communication.

Further, the present disclosure proposes a method of combining precoding of a base station with an IF scheme and an intra-cell interference/inter-cell interference control method of a User Equipment (UE) in downlink (DL) MU-MIMO communication.

The present disclosure proposes a communication method of a Base Station (BS) using an IF scheme in an MU-MIMO communication system, the method including: receiving a reception signal including a desired signal transmitted from at least one UE served by the BS and an interference signal transmitted from at least one UE served by a neighboring-cell BS; determining an IF filter considering the interference signal based on information on the interference signal received from the neighboring-cell BS; filtering the reception signal using the determined IF filter; and detecting or decoding at least one of the desired signal and the interference signal using the filtered reception signal.

The present disclosure proposes a communication method of a UE using an IF scheme in an MU-MIMO communication system including a first group of a UE having a first MCS and a second group of a UE having a second MCS, the method including: receiving signaling for setting the first MCS or the second MCS from a BS; determining an MCS to be applied to a transport data stream among the first MCS and the second MCS; encoding the transport data stream using the first MCS when the determined MCS is the first MCS; encoding the transport data stream using the second MCS and encoding the transport data stream using the first MCS when the determined MCS is the second MCS; and transmitting the encoded data stream.

The present disclosure proposes a BS using an IF scheme in an MU-MIMO communication system, the BS including: a transceiver that receives a reception signal including a desired signal transmitted from at least one UE served by the BS and an interference signal transmitted from at least one UE served by a neighboring-cell BS; and a controller that determines an IF filter considering the interference signal based on information on the interference signal received from the neighboring-cell BS, filters the reception signal using the determined IF filter, and detects or decodes at least one of the desired signal and the interference signal using the filtered reception signal.

The present disclosure proposes a UE using an IF scheme in an MU-MIMO communication system including a first group of a UE having a first MCS and a second group of a UE having a second MCS, the UE including: a transceiver that receives signaling for setting the first MCS or the second MCS from a BS; and a controller that determines an MCS to be applied to a transport data stream among the first MCS and the second MCS, encodes the transport data stream using the first MCS when the determined MCS is the first MCS, encodes the transport data stream using the second MCS and encodes the transport data stream using the first MCS when the determined MCS is the second MCS, and transmits the encoded data stream.

The performance gain of IF increases as the number of antennas increases or a channel becomes singular (that is, a condition number increases). In MU-MIMO communication, since a BS includes a number of antennas and simultaneously supports a plurality of users, an effective channel matrix has a great size and a condition number increases. Thus, schemes proposed in the present disclosure may achieve higher performance gain than the performance gain of IF obtained in Single-User MIMO (SU-MIMO) communication.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Hereinafter, embodiments of the present disclosure will be described in detail with reference to the accompanying drawings. In the following description of the present disclosure, a detailed description of known configurations or functions incorporated herein will be omitted when it is determined that the detailed description may make the subject matter of the present disclosure unclear. The terms as described below are defined in consideration of the functions in the embodiments, and the meaning of the terms may vary according to the intention of a user or operator, convention, or the like. Therefore, the definitions of the terms should be made based on the contents throughout the specification.

Before a detailed description of the present disclosure is made, examples of interpretable meanings of several terms used in the present disclosure will be suggested. However, it should be noted that the terms are not limited to the examples provided below.

A transmitting end is an entity that transmits information bits in a wireless communication system, which may be a user equipment in uplink (UL) transmission and may be a base station in downlink (DL) transmission.

A receiving end is an entity that receives information bits in a wireless communication system, which may be a base station in UL transmission and may be a user equipment in DL transmission.

A base station is an entity that communicates with a UE and may also be referred to as a BS, a NodeB (NB), an eNode B (eNB), an Access Point (AP), or the like.

A user equipment is an entity that communicates with a base station and may also be referred to as a UE, a Mobile Station (MS), a Mobile Equipment (ME), a device, a terminal, or the like.

A desired signal refers to a signal that a receiving end desires to receive among signals transmitted from a transmitting end, and an interference signal refers to a signal other than the desired signal among signals received by the receiving end. Thus, a reception signal may include a desired signal and an interference signal.

Figure 1:
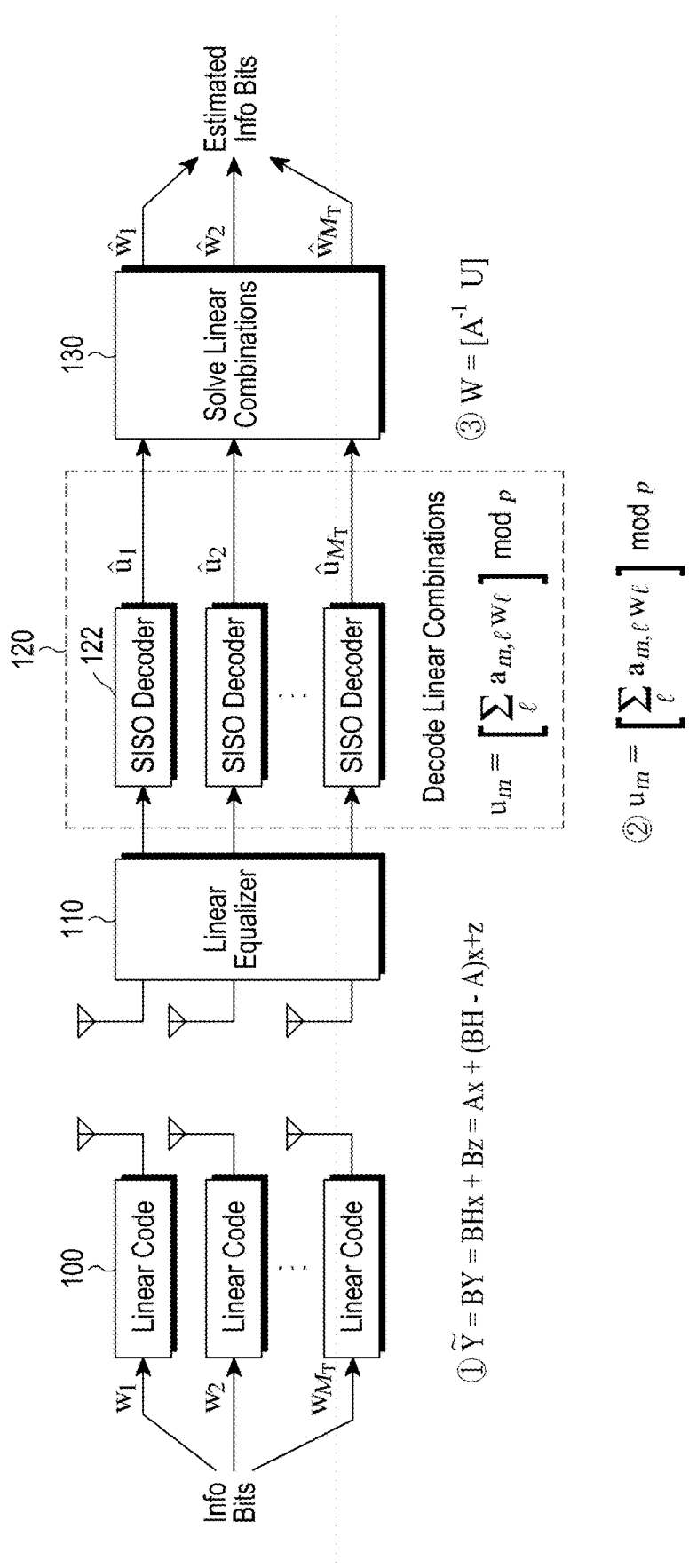
FIG. 1 shows an illustrative structure of a transmitting end and a receiving end to which an IF scheme is applied according to the present disclosure.

FIG. 1 shows an illustrative structure of a transmitting end and a receiving end to which an Integer Forcing (IF) scheme is applied.

The basic operation of the IF scheme is as follows.

The IF scheme is a technique in which a receiving end decodes 120 the sum of codewords without channel inversion, using a characteristic that the modulo sum of linear codes 100 becomes another code. Using this scheme, noise amplification may be avoided, which occurs in existing linear schemes when demultiplexing multiple data streams. That is, the receiving end may decode the sum of codewords directly into $\hat{u}_1$ and $\hat{u}_2$ without performing channel inversion, using the property that the sum of codewords is also another codeword. Subsequently, the receiving end may solve 130 a linear equation through channel inversion in order to decode transmitted original data streams $x_1$ and $x_2$.

Specifically, the receiving end may first force channel matrix H into integer matrix A using forcing matrix (or IF filter) B. For example, a received signal is represented by y'=By=Ax+(BH−A)x+z, where the receiving end may force the channel matrix into the integer matrix considering (BH−A)x+z as an effective noise. Subsequently, the receiving end may directly decode $u_m$, which is the sum of original codewords, to an SISO decoder 120 (into $\hat{u}_m$) using the characteristic of a linear code (that is, the linear sum of codewords is also a codeword). As a result of decoding, the receiving end may extract the original codewords $w_m$ from the noise-free linear sum codeword $\hat{u}_m$ (for example, using an inversion operation $W=[A^{-1}U]$).

In Equations ①, ②, and ③ illustrated in FIG. 1, z denotes a noise vector, $a_{m,j}$ denotes an (m,l)-th element in the integer matrix A, W denotes a matrix including [$w_1$, $w_2$, ..., $w_{M_T}$], and U denotes a matrix including [$u_1$, $u_2$, ..., $u_{M_T}$].

The performance gain of the IF scheme increases as the number of antennas increases or as a channel becomes singular. That a channel becomes singular means that the correlation of the channel increases, and such a singular characteristic may be expressed by a condition number. A condition number is defined as a value of the maximum singular rank of a channel matrix divided by the minimum singular rank. The channel becomes singular (the singular characteristic is improved) as the condition number increases.

In Multi-User Multiple-Input and Multiple-Output (MU-MIMO) communication, since a BS includes a number of antennas and simultaneously supports a plurality of users, an effective channel matrix has a great size and a condition number increases. Therefore, the IF scheme may achieve higher performance gain in MU-MIMO communication than Single-User MIMO (SU-MIMO) communication.

However, since SU-MIMO communication considers a single user, if an IF scheme considering SU-MIMO is applied to UL MU-MIMO, there is a constraint that one same Modulation and Coding Scheme (MCS) needs to be employed for MU-MIMO UEs (or an MCS for streams of the UEs). Therefore, a method of optimally grouping UE(s) to perform UL transmission using the same MCS or a method for supporting even a user using a different MCS in an MU-MIMO IF scheme is required.

Further, when the IF scheme is applied to DL MU-MIMO, it is required to combine a precoding scheme of the transmitting end and the IF scheme. In addition, there is a need for a method for obtaining performance gain in DL transmission/reception using the fact that the BS includes a great number of antennas, compared to IF, and a transmission/reception scheme considering intra-cell interference and inter-cell interference, which are not considered in DL SU-MIMO communication.

Accordingly, the present disclosure proposes methods for applying an IF scheme developed in an SU-MIMO environment to an MU-MIMO environment. Specifically, the present disclosure proposes an inter-cell interference control method of a BS using an IF scheme, an IF filter setting method, and an MCS allocation method in UL MU-MIMO communication. Further, the present disclosure proposes a method of combining precoding of a BS with IF of a UE and an intra-cell/inter-cell interference control technique of a UE in DL MU-MIMO communication.

A UL MU-MIMO IF scheme is described.

Figure 2:
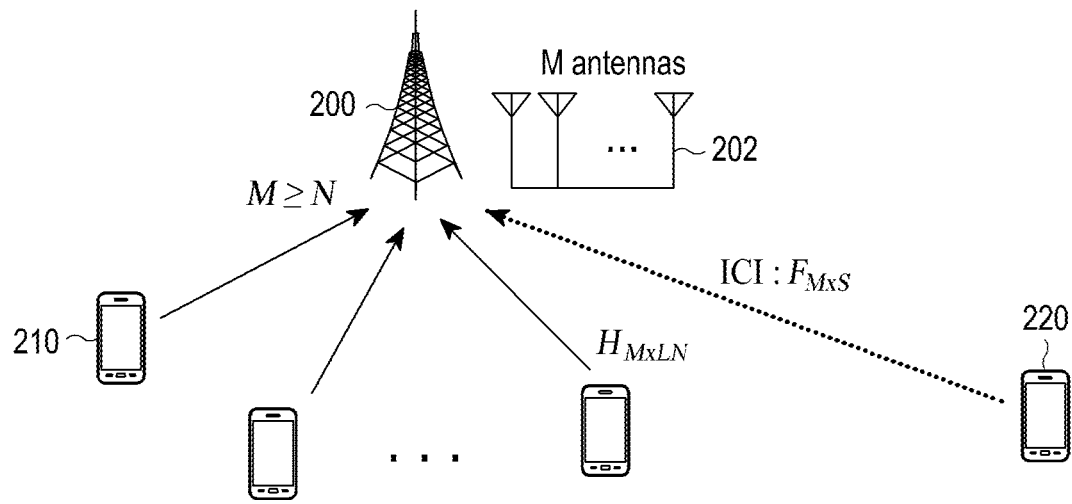
FIG. 2 illustrates a UL MU-MIMO channel in a wireless communication system according to the present disclosure.

FIG. 2 illustrates a UL MU-MIMO channel in a wireless communication system.

Referring to FIG. 2, suppose that a BS 200 uses M antennas 202 and a UE 210 uses L antennas. In FIG. 2, N UEs are performing UL transmission to the BS 200, and thus channel H between the BS 200 and the N UEs is given as an M×LN matrix. Also, channel F of inter-cell interference (ICI) generated from a neighboring cell is given as an M×S matrix, where S represents the number of UEs 220 served by the neighboring cell.

The UL MU-MIMO IF scheme proposed by the present disclosure may include at least one of the following operations. A first operation is an inter-cell interference control operation, a second operation is an operation of determining a reception mode of an IF filter, and a third operation is an operation of determining the number of transport streams and an MCS for each UE.

First, an inter-cell interference control operation of a BS in the UL MU-MIMO IF scheme will be described.

Suppose that the BS knows a channel F of an inter-cell interference signal and the strength of the inter-cell interference signal.

The BS may determine whether the strength of the inter-cell interference signal is a threshold or greater (for example, $\|F\| \geq \delta_{th}$) thereby determining whether to perform inter-cell interference control. When the strength of the inter-cell interference signal is less than the threshold, the BS may consider the inter-cell interference signal as noise and may not apply any interference control scheme. When the BS determines that the strength of the inter-cell interference signal is the threshold or greater and thus applies an inter-cell interference control scheme, different interference control schemes may be employed depending on the level of interference information (the degree of detail of the interference information) obtained by the BS as follows.

A. When the Interference Information Obtained by the BS is the Channel and the Interference-to-Noise Ratio (INR) of the Interference Signal:

When applying a filter for the IF scheme, the BS may use the following forcing matrix B as an IF filter considering not only a user of a serving cell but also inter-cell interference.

$$B = SNR A H^T (I + INR F F^T + SNR H H^T)^{-1} \quad \text{[Equation 1]}$$

Here, I denotes an identity matrix, $H^T$ denotes the transpose matrix of H, and $(\ )^{-1}$ denotes an inverse matrix.

B. When the BS can Obtain Symbol-Level Information (for Example, Modulation Order) on the Interference Signal but Cannot Obtain Codeword-Level Information:

Here, the symbol level information may be, for example, information on a modulation order such as Binary Phase Shift Keying (BPSK), 16-Quadrature Amplitude Modulation (16-QAM), and 64-QAM. The BS may perform IF detection and symbol-level Successive Interference Cancellation (SIC). That is, the BS may: i) perform IF detection on the sum of interference symbols and desired symbols; ii) may perform symbol-level blind detection on the sum of the interference symbols on the basis of the IF-detected interference symbols and desired symbols; and iii) may perform the SIC of the blind-detected interference symbols from the IF-detected interference symbols and desired symbols, thereby obtaining the desired symbols. For example, the blind detection on the sum of the interference symbols may be performed through Log-Likelihood Ratio (LLR) calculation considering a constellation, where the constellation may be determined on the symbol-level information on the interference signal, that is, the modulation order. A detailed description on the blind detection by the LLR calculation considering the constellation may obscure the essence of the present disclosure and thus is omitted herein. In this case, the BS may use IF filter B represented by Equation 2.

$$B = SNR A \bar{H}^T (I + SNR \bar{H} \bar{H}^T)^{-1} \text{ where } \bar{H} = [H\ F] \quad \text{[Equation 2]}$$

C. When the BS can Obtain Even Codeword-Level Information (for Example, a Encoding Scheme and Coding Rate) which Enables Decoding of the Interference Signal, and Includes a Great Number of Antennas:

The BS may apply an IF decoding scheme using the codeword-level information. That is, the BS may: i) first perform IF decoding of the sum of the interference signal and a desired signal; and ii) separately decode the interference signal and the desired signal based on the decoded signal. For example, decoding of each of the interference signal and the desired signal may be performed by LLR calculation considering a constellation and an inversion operation, where the constellation may be determined on the symbol-level information on the interference signal, that is, the modulation order. A detailed description on decoding using the LLR calculation considering the constellation and the inversion operation may obscure the essence of the present disclosure and thus is omitted herein. When an error occurs in decoding the interference signal and the desired signal, the BS may declare an error. However, it may not be considered as an error that the BS successfully decodes the desired signal and fails to decode the interference signal. In this case, the BS may use IF filter B represented by Equation 2.

Next, an operation of determining, by a BS, a reception mode of an IF filter (or IF inner filter) in the UL MU-MIMO IF scheme will be described.

Since the BS typically uses a large number of antennas, it is possible to improve IF performance by using the large number of antennas. The BS may determine the number of streams of each UE based on an effective channel obtained by applying IF filter B determined in the inter-cell interference control operation. When the number of receiving antennas of the BS is greater than the sum of the numbers of streams of the UEs, the BS may improve IF performance by using one of the following two modes.

A first reception mode is a diversity mode.

Figure 3:
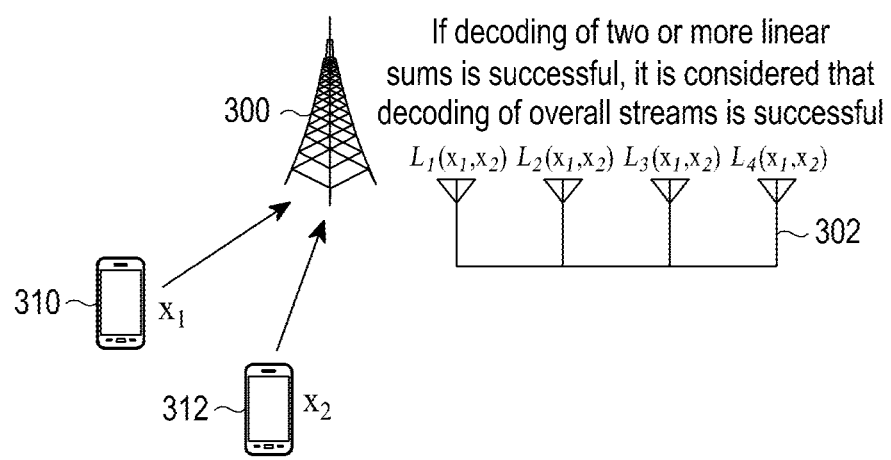
FIG. 3 illustrates a diversity mode of an IF filter according to the present disclosure.

FIG. 3 illustrates a diversity mode.

When a BS 300 includes a large number of antennas 302, the BS 300 may obtain a greater number of linear sums than the number of streams transmitted by UEs 310 and 312 from the large number of antennas. In the diversity mode, the BS 300 decodes a linear sum received from each receiving antenna. Therefore, in this case, the IF filter may be set to use linear sums from the antennas of the BS. In FIG. 3, $L_1(x_1, x_2)$, $L_2(x_1, x_2)$, $L_3(x_1, x_2)$, and $L_4(x_1, x_2)$ denote a linear sum obtained by applying the IF filter to a signal received via the receiving antennas. If decoding of a number of linear sums equal to or greater than the number of streams transmitted by the UEs (2 in this case) is successful among results of decoding performed with respect to the receiving antennas of the BS, it is considered that decoding of overall transmitted streams is successful. Thus, the BS may obtain diversity gain due to the number of antennas in the diversity mode.

A second reception mode is a Maximal-Ratio Combining (MRC) mode.

Figure 4:
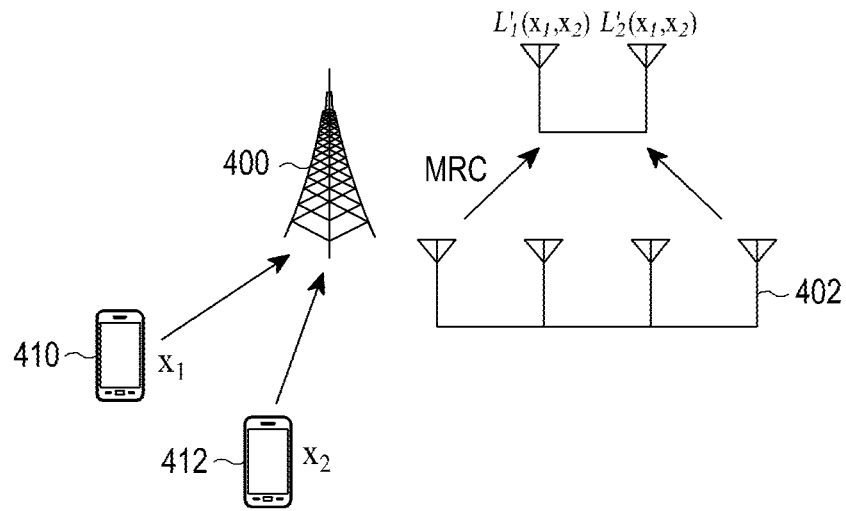
FIG. 4 illustrates an MRC mode of an IF filter according to the present disclosure.

FIG. 4 illustrates an MRC mode.

In FIG. 4, suppose that two UEs 410 and 412 each perform UL transmission of one stream to a BS 400. The BS 400 may also consider a method of obtaining Signal-to-Noise Ratio (SNR) gain through the MRC of receiving antennas 402.

In the MRC mode, the BS 400 may use, as an IF filter, MRC matrix $\tilde{B}$ adjusted such that the size of an effective channel matrix becomes equal to the number of streams (2 in this case). For example, MRC matrix $\tilde{B}$ (that is, the IF filter) is selected from left singular vectors of channel matrix H, where the size of MRC matrix $\tilde{B}$ is equal to the total number of streams (2 in this case). The BS may obtain SNR gain by using some left singular vectors (that is, the MRC matrix) selected from the channel matrix defined by a plurality of antennas. In FIG. 4, $L'_1(x_1, x_2)$ and $L'_2(x_1, x_2)$ denote a linear sum obtained by applying the MRC matrix to a signal received via the receiving antennas. The MRC mode may be expected to have high gain especially in a hybrid beamforming system in which the number of antennas is greater than the number of Radio Frequency (RF) chains.

The two IF filter reception modes may be applied not only in the MU-MIMO environment but also in the SU-MIMO environment. Here, in order to achieve diversity gain and MRC, a BS as a receiving end is required to have a greater number of antennas than a UE as a transmitting end.

Next, an operation of determining the number of streams and an MCS for each UE in the UL MU-MIMO IF scheme will be described.

As described above, since one MCS is considered for one user (that is, UE) in the SU-MIMO IF scheme, if SU-MIMO IF is intactly applied as MU-MIMO IF, there is a constraint that one MCS needs to be applied for a plurality of users (that is, UEs). However, since the same MCS may not always be employed for a plurality of UEs, a UL MU-MIMO IF scheme for supporting UEs using different MCSs is proposed.

A. Same MCS UE Grouping (or Pairing)-Based IF Scheme:

The BS may apply the IF scheme by grouping UEs (or streams) to which the same MCS is allocated. Here, the number of streams UL-transmitted by each UE may vary. Here, the BS may decode the sum of codewords of the grouped UEs first and may decode the codewords of the respective UEs through an inversion A operation.

Although there is a constraint that the BS is required to group UEs having the same MCS, an IF receiver according to the present disclosure is robust to a correlation between channels as compared with a MMSE receiver or an MMSE-SIC receiver, and thus performance gain may be expected to be obtained even if grouping users that are relatively close (and thus have similar communication environments and are highly likely to use the same MCS).

B. Application of Layered Encoding:

The aforementioned grouping-based IF scheme may be easily applied using the SU-MIMO IF scheme but has a constraint in scheduling that the BS is required to group only UEs with the same MCS. Layered encoding may be applied to the IF scheme so that the BS may schedule UEs with different MCSs together. Specifically, the BS may schedule layered encoding in which the same first MCS is applied to the UEs regardless of an MCS to be allocated (for example, encoding rate) and a second MCS is additionally applied to UEs belonging to a group with a poor channel. That is, the BS may allocate an MCS, which is the same as used for a UE with a good channel, to a UE with a poor channel, and may apply an additional MCS to the UE with the poor channel.

Figure 5:
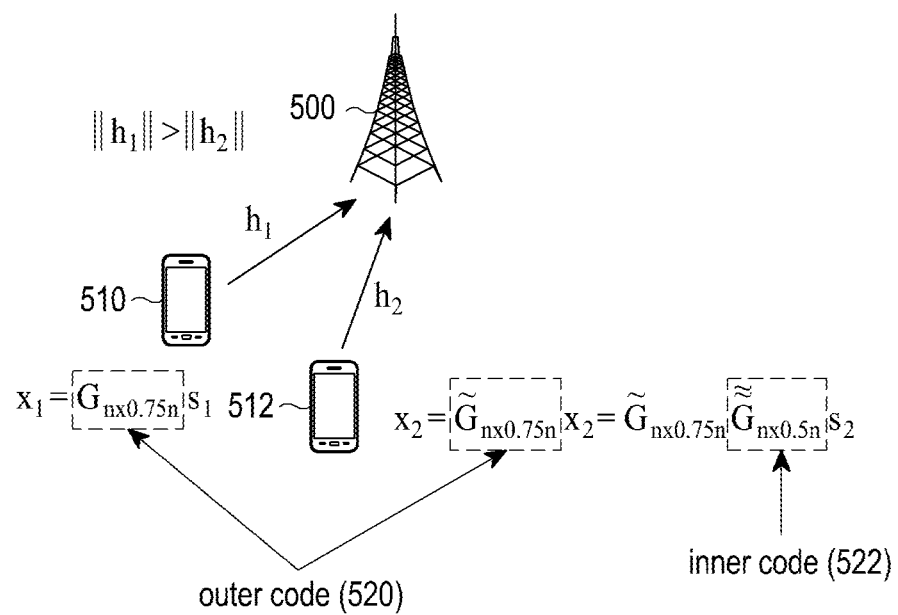
FIG. 5 illustrates an MU-MIMO IF scheme for a case where UEs with different SNRs are scheduled by applying layered encoding according to the present disclosure.

FIG. 5 illustrates an MU-MIMO IF scheme for a case where UEs with different SNRs are scheduled by applying layered encoding according to the present disclosure.

For example, when there are a first group to which UE 1 510 with a good channel (for example, a channel measurement of a threshold or higher) belongs and a second group to which UE 2 512 with a poor channel (for example, a channel measurement less than the threshold) belongs ($\|h_1\| > \|h_2\|$), a BS 500 may schedule a first MCS to be applied to a good-channel group for the UEs 510 and 512 in the first group and the second group, and may schedule a second MCS to be additionally applied for the UE in the second group. Although termed an MCS, a scheme that a BS schedules for a UE in layered encoding may denote only a coding scheme (excluding a modulation scheme). Here, the first MCS applied to the UEs in both the first group and the second group may be referred to as an outer code, and the second MCS applied to the UE in the second group with a poor channel state may be referred to as an inner code.

Referring to FIG. 5, suppose that as UE 1 510 has a good channel quality, on the basis of SNR, 16-QAM and a code rate of 0.75 need to be allocated for UE 1 510 and 16-QAM and a code rate of 0.5 need to be allocated for UE 2 512. Here, $s_1$ and $s_2$ denote the information bits of UE 1 510 and UE 2 512, and $G_{n \times 0.75n}$, $\tilde{G}_{n \times 0.75n}$, and $\tilde{\tilde{G}}_{0.75n \times 0.5n}$ denote a code generation matrix. Here, a BS 500 schedules 16-QAM and a code rate of 0.75 as an outer code 520 to be applied to both UE 1 510 and UE 2 512. Since UE 2 512 is allocated a higher MCS than the SNR thereof, the BS 500 performs scheduling so that UE 2 512 further uses a code rate of ⅔ as an internal code 522.

In this case, when applying the IF scheme, the BS may first apply the outer code to decode a stream of UE 1 and to separate a stream of UE 2, and may further apply the inner code to the separated stream of UE 2 to successfully decode the stream of UE 2.

Figure 6:
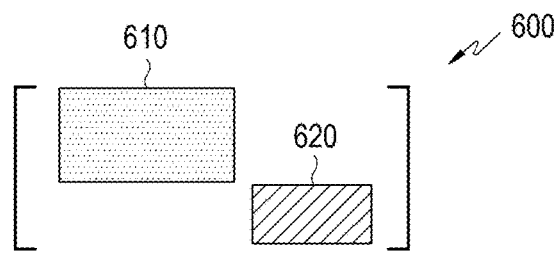
FIG. 6 illustrates a block diagonal matrix for setting different MCSs according to the present disclosure.

C. Scheme of Restricting the Structure of an Integer Matrix to a Specific Structure:

FIG. 6 illustrates a block diagonal matrix for setting different MCSs.

When applying the IF scheme, the BS may specify integer matrix A as a block diagonal matrix 600 to support different MCSs.

Specifically, the BS may group UEs having the same SNR-based MCS, and may set an integer matrix for the grouped UEs as a block diagonal matrix. Then, the BS may apply the IF scheme to each group (individual block matrices 610 and 620 forming the block diagonal matrix). This scheme may prevent an integer linear sum of UEs with different MCSs due to the block diagonal structure of the integer matrix but restricts the integer matrix to the block diagonal matrix, thus causing relatively higher noise enhancement than when the users use the same MCS.

D. Scheme for Performing IF Detection on the Sum of Symbols and then Performing SIC on Symbols with Different Modulation Levels:

The BS performs symbol SIC per modulation level, similarly to MMSE-SIC, and performs decoding after detecting all symbols per each modulation level. Since the BS performs symbol SIC, this scheme may exhibit slightly lower performance (by about 1 dB) than a scheme of performing codeword SIC but is advantageous in that MU-MIMO IF may be applied to UEs having different MCSs. Here, this scheme may be applied although UEs are allocated different modulation orders and different code rates.

A DL MU-MIMO IF scheme is described.

Figure 7:
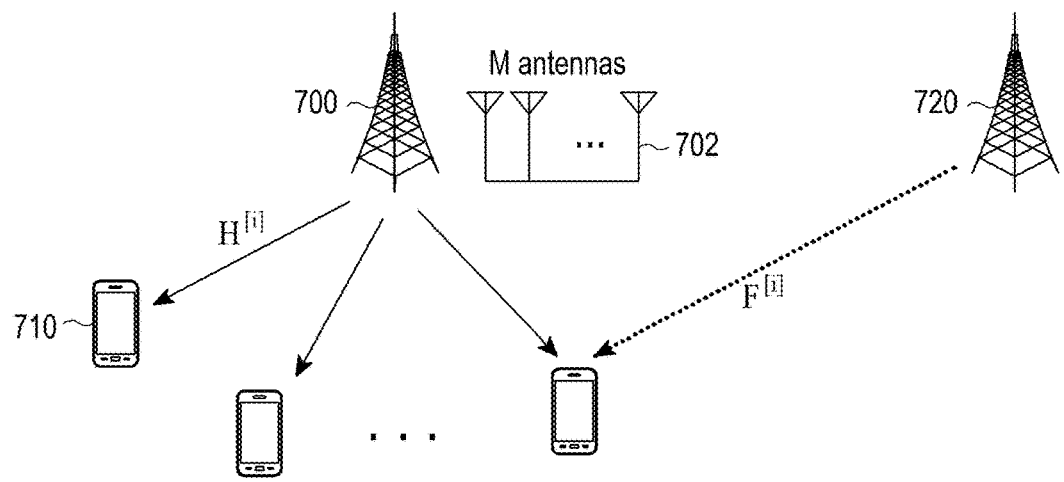
FIG. 7 illustrates a DL MU-MIMO channel in a wireless communication system according to the present disclosure.

FIG. 7 illustrates a DL MU-MIMO channel in a wireless communication system.

As in the UL MU-MIMO channel, suppose that a BS 700 uses M antennas 702 and a UE 710 uses L antennas, where L≥2. N UEs are served by the BS 700, and thus channel $H^{[i]}$ between the BS 700 and each UE i is given as an M×L matrix. In addition, channel $F^{[i]}$ of inter-cell interference experienced by the UE 710 i is given as an L×S matrix.

The DL MU-MIMO IF scheme of the present disclosure may include at least one of the following operations. A first operation is an operation of, by a transmitting end (that is, a UE), setting precoding/setting a stream per UE, and a second operation is an operation of, by a receiving end, decoding a Single User (SU) multi-stream or controlling inter-cell/intra-cell interference.

First, an operation of setting transmitting-end precoding in the DL MU-MIMO IF scheme is described.

Figure 8:
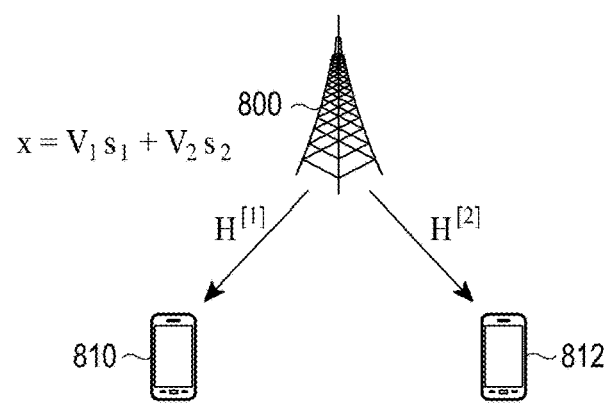
FIG. 8 illustrates a DL MU-MIMO precoding scheme according to the present disclosure.

FIG. 8 illustrates a DL MU-MIMO precoding scheme.

Zero Forcing (ZF) precoding as a DL MU-MIMO scheme may be set to satisfy the following equation in the transmission of each stream.

$$H^{[i]}V_j = 0, i \neq j \qquad \text{[Equation 3]}$$

Equation 3 shows that perfect nulling (an operation of completely canceling interference between users) is achieved with respect to different UEs (i≠j) when ZF precoding is applied.

However, there may be no ZF solution to satisfy Equation 3 depending on the number of antennas of a BS/UE and the number of UEs (for example, when M≤LN). Thus, with no ZF solution, it is impossible to achieve perfect nulling of interference between users, and thus partial nulling or residual intra-cell interference processing may be applied.

When DL UEs 810 and 812 are close to each other, when the angle of spread is small, or when no multi-path is guaranteed, a correlation between channels may become high. Here, overall channels are nearly singular (near singular), and thus effective channel gain $H^{[i]}V_i$ obtained after applying beamforming may become small, thus causing significant performance deterioration.

Therefore, the present disclosure proposes the following IF-precoding in order to overcome the performance deterioration of the DL MU-MIMO scheme.

Specifically, 1) precoding may be performed to maximize each desired link, instead of nulling interference. 2) Partial nulling or precoding may not be performed. 3) Precoding (robust to a channel change) is performed to compensate for a channel change, instead of precoding for nulling.

When precoding is set by these methods, each UE also receives a signal from another UE as an interference signal. Here, the UE may attempt to decode (the entirety or part of) the interference signal and a desired signal using IF. Here, total dimensions of interference that the UE attempt to decode are given as L-desired dimensions of the desired signal, and partial nulling may be performed to adjust the amount of interference.

Further, when UEs have different MSCs, layered encoding (inner code/outer code) described in UL MU-MIMO may be also used for DL MU-MIMO, or IF detection and symbol-level SIC may be applied, in order to facilitate interference decoding.

The proposed method may achieve great gain when the number of receiving antennas of a UE is a certain number or greater or when a condition number is a specific value or higher. Thus, when a condition number of the channels [$H^{[1]}$ $H^{[2]}$ ... $H^{[N]}$] is greater than a threshold or an effective channel gain obtained by applying ZF precoding is less than a threshold $\delta_{th}$ (that is, $$\min_i H^{[i]} V_i \le \delta_{th}),$$

the proposed scheme of the present disclosure may be performed.

Next, an operation of, by a receiving end, decoding a multi-stream or controlling inter-cell/intra-cell interference in the DL MU-MIMO IF scheme is described.

A. Decoding of SU Multi-Stream/Single Stream

This operation is applied when inter-cell interference is completely canceled by ZF precoding or the like. In the transmission of a single stream to a user, an MMSE scheme may be applied. In the transmission of a multi-stream transmission, an IF scheme may be applied for decoding without considering interference.

B. Mitigation of Intra-Cell Interference

This operation is a decoding scheme of a receiving end corresponding to IF precoding of a transmitting end and decodes an interference signal and a desired signal.

C. Mitigation of Inter-Cell Interference

Similarly to a BS controlling inter-cell interference in UL MU-MIMO, a UE may also control inter-cell interference in DL MU-MIMO. As in an operation of the BS in UL MU-MIMO, a different interference control scheme may be applied depending on the level of information on interference in an operation of the UE in DL MU-MIMO, which may be applied when the UE has a sufficient number of receiving antennas.

In both DL/UL communications, in order to control inter-cell interference (ICI), a BS needs to obtain interference channel information, and needs to be provided with interference channel information, a modulation order, code rate, a codebook, or the like depending on the scheme. Therefore, signaling between BSs may be performed to forward the interference channel information.

Further, in order to use layered encoding, such as a two-layered code, the MCSs of an outer code and an inner code (a pair of an outer code and an inner code) may be defined, or information on whether to perform layered encoding/inner code and an MCS may be provided from a BS to a UE through signaling.

Further, in DL MU-MIMO communication, when an IF precoding intra-cell interference control scheme is performed, information on whether to perform ZF/IF MU-MIMO precoding and information on intra-cell interference may be provided.

Figure 9:
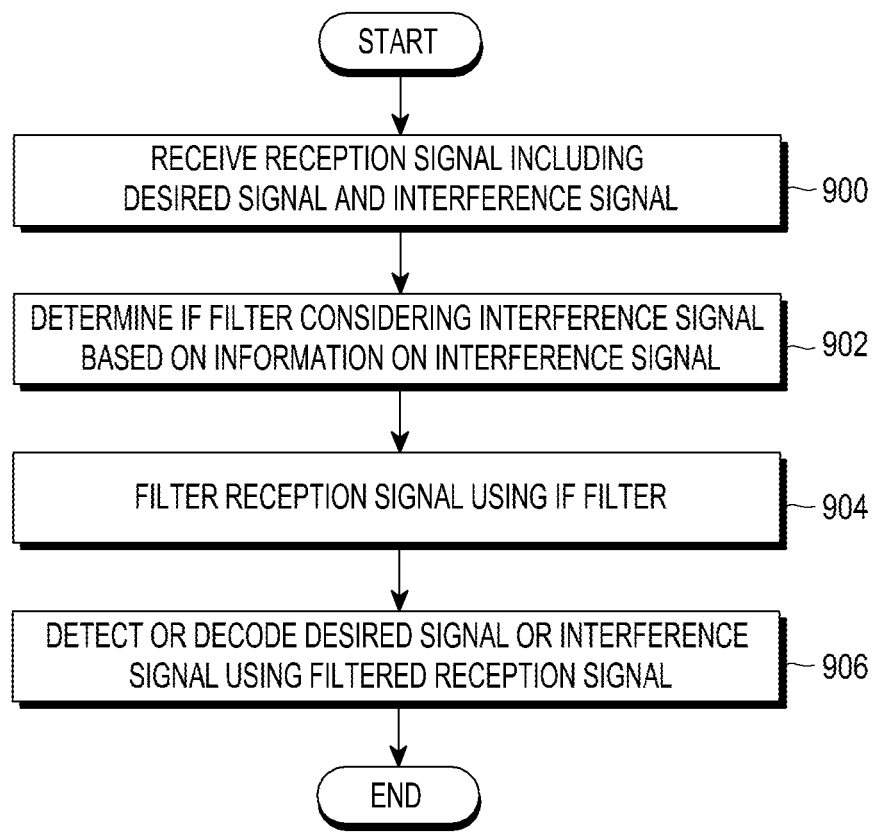
FIG. 9 is a flowchart illustrating a communication method of a BS operating according to exemplary embodiments of the present disclosure.

FIG. 9 is a flowchart illustrating a communication method of a BS operating according to exemplary embodiments of the present disclosure.

In an MU-MIMO communication system, a BS using an IF scheme may receive a desired signal from at least one UE served by the BS and an interference signal from at least one UE served by a BS of a neighboring cell (900).

The BS may receive information on the interference signal from the neighboring cell and may determine an IF filter considering the interference signal based on the information on the interference signal (902). Selectively, the IF filter may be configured such that the antennas provided in the BS each produce a linear sum (diversity mode) or produce the same number of linear sums as the number of streams transmitted from at least one UE served by the BS (MRC mode). Here, when the information on the interference signal includes symbol-level information (for example, a modulation order) on the interference signal, the BS may perform modulation order-based blind detection on the detected desired signal and interference signal to obtain interference symbols and may perform SIC of the interference symbols from the filtered received signals. When the information on the interference signal includes codeword-level information (for example, encoding information) on the interference signal, the BS may perform decoding on the desired signal and the interference signal based on the encoding information to decode at least one of the desired signal and the interfering signal.

The BS may filter the received signals using the determined IF filter (904).

The BS may detect or decode at least one of the desired signal and the interfering signal using the filtered received signals (906). Here, at least one UE served by the BS may use a different MCS. Therefore, an IF scheme may be applied in various manners to receive UL transmissions from UEs using different MCSs. For example, the BS may be configured to decode only the sum of codewords of UEs using the same MCS. For another example, decoding using a first MCS as an outer code may be performed for both a first group of UEs having the first MCS and a second group of UEs having a second MCS, and additional decoding using the second MCS as an inner code may be performed for the second group. For still another example, block diagonal matrices using separate block matrices that are divided within the IF filter may be set for the first group and the second group. For yet another example, blind detection using the first MCS may be performed for the first group, and blind detection using the second MCS may be performed for the second group.

Selectively, the BS may transmit signaling to forward configuration information for layered encoding (information on whether to perform layered encoding, information on the first MCS and the second MCS, or the like) to the at least one UE.

Figure 10:
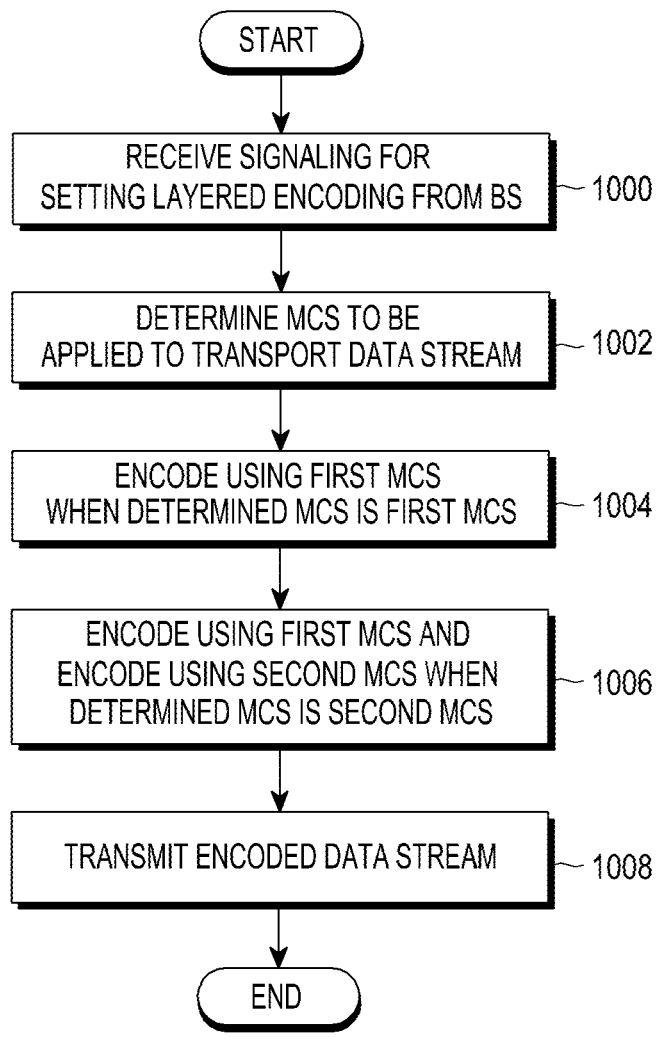
FIG. 10 is a flowchart illustrating a communication method of a UE operating according to exemplary embodiments of the present disclosure.

FIG. 10 is a flowchart illustrating a communication method of a UE operating according to exemplary embodiments of the present disclosure.

In an MU-MIMO communication system, a UE using an IF scheme may receive signaling on whether to perform layered encoding and on layered encoding (a first MCS and a second MCS) from a BS (1000).

The UE may determine an MCS to apply from signaling (1002).

When the determined MCS is a first MCS, the UE may encode a data stream to transmit by applying the first MCS (for example, 16-QAM and a code rate of 0.75) thereto (1004).

When the determined MCS is a second MCS, the UE may encode a data stream to transmit by applying the second MCS (for example, 16-QAM and a code rate of 0.5) thereto and may additionally encode the data stream by applying the first MCS (for example, 16-QAM and a code rate of 0.75) thereto (1006).

The UE may transmit the encoded data stream to the BS (1008).

Figure 11:
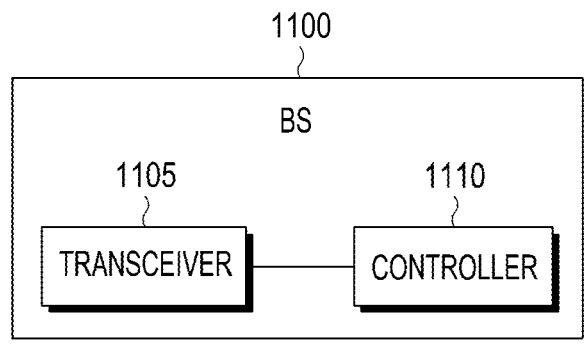
FIG. 11 illustrates a configuration of a BS device according to the present disclosure.

FIG. 11 illustrates a configuration of a BS device according to the present disclosure.

The BS device 1100 may include a transceiver 1105 to transmit and receive signals to and from a BS of a neighboring cell or a UE and a controller 1110 to control the operations of the BS device 1100. It could be understood that the foregoing schemes or methods performed by a BS in the present disclosure are performed according to control by the controller 1110. However, the controller 1110 and the transceiver 1105 are not necessarily configured as separate devices, but may also be configured as a single unit, such as a single chip.

Figure 12:
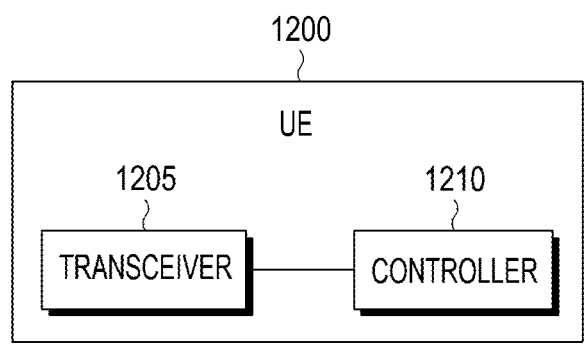
FIG. 12 illustrates a configuration of a UE device according to the present disclosure.

FIG. 12 illustrates a configuration of a UE device according to the present disclosure.

The UE device 1200 may include a transceiver 1205 to transmit/receive signals to/from a BS and a controller 1210 to control the operations of the UE device 1200. It could be understood that the foregoing schemes or methods performed by a UE in the present disclosure are performed according to control by the controller 1210. However, the controller 1210 and the transceiver 1205 are not necessarily configured as separate devices, but may also be configured as a single unit, such as a single chip.

It should be noted that diagrams showing methods, configurations of systems, and configurations of devices illustrated in FIGS. 1 through 12 are not intended to limit the scope of the present disclosure. That is, the components or operations illustrated in FIGS. 1 through 12 should not be construed as being essential components for carrying the present disclosure and the present disclosure may be implemented merely with some of the components without departing from the gist of the present disclosure.

The above-described operations may be implemented by including a memory device having a corresponding program code stored therein in a component of a BS device or a UE device. That is, a controller of the BS device or the UE device may execute the above-described operations by reading and executing the program code stored in the memory device using a processor or a Central Processing Unit (CPU).

Various components and modules of the BS device or the UE device described in the present disclosure may operate by using a hardware circuit, for example, a complementary metal oxide semiconductor-based logic circuit, firmware, software, and/or a hardware circuit, such as a combination of hardware, firmware and/or software inserted into a machine-readable medium. For example, various electric structures and methods may be implemented using electric circuits, such as transistors, logic gates, and on-demand semiconductors.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A communication method of a base station (BS), the method comprising:
    receiving a reception signal comprising a desired signal transmitted from at least one user equipment (UE) served by the BS and an interference signal transmitted from at least one other UE served by a neighboring BS, the BS using an integer forcing (IF) scheme in a multi-user multiple-input and multiple-output (MU-MIMO) communication system;
    determining an IF filter considering the interference signal based on information on the interference signal received from the neighboring BS;
    filtering the reception signal using the determined IF filter; and
    detecting or decoding at least one of the desired signal or the interference signal using the filtered reception signal.

2. The method of claim 1, wherein the IF filter is configured such that antennas provided in the BS each produce a linear sum or produce a same number of linear sums as a number of streams transmitted from the at least one UE served by the BS.

3. The method of claim 1, wherein the detecting or decoding of the at least one of the desired signal or the interference signal using the filtered reception signal is decoding the desired signal by decoding a sum of codewords in the reception signal that are transmitted from a UE having a same modulation and coding scheme (MCS).

4. The method of claim 1, wherein:
    the at least one UE served by the BS is included in a first group of UEs having a first modulation and coding scheme (MCS) or a second group of UEs having a second MCS, and
    the detecting or decoding of the at least one of the desired signal and the interference signal using the filtered reception signal comprises:
        separating a first desired signal of the first group from a second desired signal of the second group by decoding the filtered reception signal using the first MCS; and
        decoding the second desired signal of the second group using the second MCS.

5. The method of claim 4, further comprising transmitting signaling for setting the first MCS or the second MCS to the at least one UE served by the BS.

6. The method of claim 1, wherein:
    the at least one UE served by the BS is included in a first group of UEs having a first modulation and coding scheme (MCS) or a second group of UEs having a second MCS, and
    the IF filter is a block diagonal matrix comprising a first block matrix when the at least one UE is included in the first group and a second block matrix when the UE is included in the second group.

7. The method of claim 1, wherein:
    the at least one UE served by the BS is included in a first group of UEs having a first modulation and coding scheme (MCS) or a second group of UEs having a second MCS, and
    the detecting or decoding of the at least one of the desired signal and the interference signal using the filtered reception signal comprises:
        performing blind detection of a first desired signal of the first group by using the first MCS for the filtered reception signal; and
        performing blind detection of a second desired signal of the second group by using the second MCS for the filtered reception signal.

8. The method of claim 1, further comprising performing modulation order-based blind detection on the detected desired signal and interference signal to obtain an interference symbol and performing successive interference cancelation of the interference symbol from the filtered reception signal when the information on the interference signal comprises a modulation order of the interference signal.

9. The method of claim 1, further comprising decoding at least one of the desired signal and the interference signal by performing encoding information-based decoding on the decoded desired signal or the interference signal when the information on the interference signal comprises encoding information on the interference signal.

10. A communication method of a user equipment (UE), the method comprising:
receiving signaling for setting a first modulation and coding scheme (MCS) or a second MCS from a base station (BS), the BS using an integer forcing (IF) scheme in a multi-user multiple-input and multiple-output (MU-MIMO) communication system that includes a first group of UEs having the first MCS and a second group of UEs having the second MCS;
determining a MCS to be applied to a transport data stream among the first MCS and the second MCS;
encoding the transport data stream using the first MCS when the determined MCS is the first MCS;
encoding the transport data stream using the second MCS and encoding the transport data stream using the first MCS when the determined MCS is the second MCS; and
transmitting the encoded data stream.

11. A Base Station (BS) comprising:
a transceiver configured to receive a reception signal comprising a desired signal transmitted from at least one user equipment (UE) served by the BS and an interference signal transmitted from at least one other UE served by a neighboring BS, wherein the BS uses an integer forcing (IF) scheme in a multi-user multiple-input and multiple-output (MU-MIMO) communication system; and
a controller configured to:
determine an IF filter considering the interference signal based on information on the interference signal received from the neighboring BS;
filter the reception signal using the determined IF filter; and
detect or decode at least one of the desired signal and the interference signal using the filtered reception signal.

12. The BS of claim 11, wherein the IF filter is configured such that antennas provided in the BS each produce a linear sum or produce a same number of linear sums as a number of streams transmitted from the at least one UE served by the BS.

13. The BS of claim 11, wherein the controller is configured to decode the desired signal by decoding a sum of codewords in the reception signal that are transmitted from a UE having the same modulation and coding scheme (MCS).

14. The BS of claim 11, wherein:
the at least one UE served by the BS is included in a first group of UEs having a first modulation and coding scheme (MCS) or a second group of UEs having a second MCS, and the controller is configured to:
separate a first desired signal of the first group from a second desired signal of the second group by decoding the filtered reception signal using the first MCS; and
decode the second desired signal of the second group using the second MCS.

15. The BS of claim 14, wherein the controller is configured to control transmission of signaling for setting the first MCS or the second MCS to the at least one UE served by the BS.

16. The BS of claim 11, wherein:
the at least one UE served by the BS is included in a first group of UEs having a first modulation and coding scheme (MCS) or a second group of UEs having a second MCS, and
the IF filter is a block diagonal matrix comprising a first block matrix when the at least one UE is included in the first group and a second block matrix when the UE is included in the second group.

17. The BS of claim 11, wherein:
the at least one UE served by the BS is included in a first group of UEs having a first modulation and coding scheme (MCS) or a second group of UEs having a second MCS, and
the controller is configured to:
perform blind detection of a first desired signal of the first group by using the first MCS for the filtered reception signal, and
perform blind detection of a second desired signal of the second group by using the second MCS for the filtered reception signal.

18. The BS of claim 11, wherein when the information on the interference signal comprises a modulation order of the interference signal, the controller is configured to perform modulation order-based blind detection on the detected desired signal and interference signal to obtain an interference symbol and perform successive interference cancelation of the interference symbol from the filtered reception signal.

19. The BS of claim 11, wherein when the information on the interference signal comprises encoding information on the interference signal, the controller is configured to decode at least one of the desired signal or the interference signal by performing encoding information-based decoding on the decoded desired signal or the interference signal.

20. A User Equipment (UE) comprising:
a transceiver configured to receive signaling for setting a first modulation and coding scheme (MCS) or a second MCS from a base station (BS) using an integer forcing (IF) scheme in a multi-user multiple-input and multiple-output (MU-MIMO) communication system comprising a first group of UEs having a first MCS and a second group of UEs having a second MCS; and
a controller configured to:
determine an MCS to be applied to a transport data stream among the first MCS and the second MCS;
encode the transport data stream using the first MCS when the determined MCS is the first MCS;
encode the transport data stream using the second MCS and encode the transport data stream using the first MCS when the determined MCS is the second MCS; and
transmit the encoded data stream.

* * * * *